United States Patent [19]

Takikita

[11] Patent Number: 5,282,184
[45] Date of Patent: Jan. 25, 1994

[54] FOCUS CONTROL DEVICE OF AN OPTICAL DISK APPARATUS

[75] Inventor: Mamoru Takikita, Hachioji, Japan
[73] Assignee: Konica Corporation, Tokyo, Japan
[21] Appl. No.: 855,553
[22] Filed: Mar. 23, 1992
[30] Foreign Application Priority Data
Mar. 29, 1991 [JP] Japan .................. 3-066259
[51] Int. Cl.$^5$ .................................. G11B 7/00
[52] U.S. Cl. ............... 369/44.25; 369/44.28; 369/124; 369/44.27
[58] Field of Search ............ 369/44.32, 32, 112, 369/124, 48, 54, 44.34, 44.25–44.29

[56] References Cited

U.S. PATENT DOCUMENTS

| | | | |
|---|---|---|---|
| 5,034,940 | 7/1991 | Saito et al. ............... | 369/54 |
| 5,142,517 | 8/1992 | Takahashi ............... | 369/44.25 |
| 5,142,520 | 8/1992 | Yanagi et al. ............ | 369/44.32 |
| 5,164,932 | 11/1992 | Fennema et al. ........ | 369/44.32 |

*Primary Examiner*—Andrew L. Sniezek
*Assistant Examiner*—Nabil Hindi
*Attorney, Agent, or Firm*—Finnegan, Henderson, Farabow, Garrett & Dunner

[57] ABSTRACT

An automatic focusing device of an optical disk apparatus with a capability of automatically focusing a light beam at an optimal position relative to the surface of a track of an optical disk by a selection of an optimal value of an offset voltage is disclosed. A focusing servo of the device keeps a focal point of the light beam at a relative position to the surface of the track, which is adapted to shift the relative position by applying an offset voltage. A tracking error detector generates a tracking error signal with peaks same in number as the number of tracks having been traversed by the focal point. A comparator generates a comparison pulse each time when the peak is higher than a predetermined threshold level. A counter counts the number of the pulses in the tracking error signal. After repeating the generation, the comparison and the counting for a plurality of times, each time with the application of a different value of the offset volatge, a judging circuit adopts the value of the offset voltage corresponding to the maximum number among the counted numbers as the optimal value of the offset voltage to be applied in a seek mode of the optical disk apparatus to directly transfer the focal point to a desired track.

5 Claims, 6 Drawing Sheets

FOCUS CONTROL DEVICE OF AN OPTICAL DISK APPARATUS

BACKGROUND OF THE INVENTION

The present invention relates to a focus control device of an optical disk apparatus, and more particularly relates to a focus control device having an automatic setting function of an optimal offset signal of an optical magnetic disk.

In order to read and write data precisely in an optical magnetic disk apparatus, it is necessary to reduce the focal error into the range of focal depth of an objective lens. Therefore, focus servo control is conducted in the apparatus. One typical focal error detecting system used for an optical disk apparatus is the astigmatic method in which cylindrical lenses causing astigmatism are utilized. According to this method, the focus error signal is represented by an S-shaped curve shown in FIG. 3 with regard to the focal error in the servo block range. Therefore, in an ideal condition, the voltage of the focus error signal becomes 0V (which is the same as ground) at a correctly focused point. When the device is designed, the target control value is 0V (ground), and feedback control is conducted so that the level of the focus error signal can converge to the ground level.

However, in a practical device, depending upon the error caused in the manufacturing process of the optical disk, the characteristic error of the optical system, the characteristic error of the circuit, and changes of the characteristics caused by changes of the environment, the actual correctly focused point (referred to hereon as an actual focus point) is shifted from the ground, and offset $V_{off}$ exists in the position shown in FIG. 3. Therefore, in order to make the servo control target value (the convergence point) coincide with the actual focus point, the following method has been conventionally taken in the manufacturing process: a semi-fixed resistance is adjusted in order to impress the offset voltage upon the control section of the focus drive mechanism.

The conventional method in which a predetermined offset signal is previously given in the manufacturing process, cannot follow the change of the optical system caused by environmental change or deterioration with age, and further the conventional method cannot follow the very small change of the actual focus point which is caused by the offset of the circuit. Accordingly, when high accuracy is required, reliability is lowered.

According to the results of the investigation conducted by the inventors, the conventional adjusting method has the following problem in the case where the disk is changed: especially when a seeking operation is conducted, in other words, when a reading-out beam is rapidly moved to the target track, the accuracy of the track position detection signal is deteriorated, so that the beam cannot be correctly stopped at the target track; and further the actual focus point in the case of a playback/write-in operation is different from that in the case of a seeking operation.

SUMMARY OF THE INVENTION

The present invention has been achieved in accordance with the aforementioned results of the investigation conducted by the inventors. The object of the present invention is to provide a focus control mechanism characterized in that: the accuracy of a focus servo operation is high; the reliability is high; and highly accurate control can be conducted.

The configuration of the device of the present invention will be described below. In the present invention, the most appropriate value (the offset voltage) of the offset signal which is used for the focus servo operation when a seeking operation is conducted, is automatically detected using a track error signal for use in a tracking servo operation. That is, the most appropriate value of the offset signal is determined in such a manner that: the track error signal obtained when a beam dot crosses an adjacent track due to the eccentricity of the disk, is compared with a threshold value (a threshold voltage); and the point at which the track error signal exceeds the threshold value most frequently, is detected. That is, the offset voltage is supplied to the focus control circuit so that the frequency by which the track error signal exceeds the threshold value becomes the most. For example, the detection of the most appropriate offset voltage is conducted each time the disk is replaced.

According to the present invention, the most appropriate offset voltage in the case where the track is chased when data is played back or written in, and the most appropriate offset voltage in the case where a seeking operation is conducted (the track is shifted), are separately obtained and stored in a register, and the stored offset voltage is selectively read out from the register in each mode and supplied to the focus control circuit.

That is, in the present invention, the conventional uniform offset voltage system is not adopted, and when a disk is set, a particular offset detecting operation is carried out for the disk so that the most appropriate offset voltage is determined for each disk. In this case, an actual seeking operation is not conducted to determine the most appropriate offset voltage, because it is difficult to conduct such an operation each time the disk is replaced. Consideration is given to the fact that the disk is necessarily made eccentric due to error in the manufacturing process, and the eccentricity of the disk is positively utilized to determine the most appropriate offset value when the seeking operation is conducted. That is, the disk is rotated under the condition that the focus servo is turned on and the tracking servo is turned off. In the case in which the track error signal is taken out under the aforementioned condition, feedback control in accordance with the track error signal is not conducted, so that the beam dot does not follow the track correctly. Accordingly, the track crosses the path of the beam dot since the disk is eccentric, which causes the diffraction of light.

DETAILED DESCRIPTION OF THE PREFERRED EMBODIMENTS

In the present invention, the conventional method by which the offset voltage is uniformly set in the manufacturing process, is not adopted, and a particular operation is conducted on a disk in order to detect the offset, so that the most appropriate offset voltage of each disk is determined to conduct a seeking operation. In this case, an actual seeking operation is not conducted to determine the most appropriate offset voltage, because it is difficult to conduct such an operation each time the disk is replaced. Consideration is given to the fact that the disk is necessarily made eccentric due to the error caused in the manufacturing process, and the eccentricity of the disk is positively utilized to determine the most appropriate offset value when the seeking operation is conducted. That is, the disk is rotated under the condition that the focus servo is turned on and the tracking servo is turned off. The behavior in the case where the track error signal is taken out under the aforementioned condition, will be considered as follows. In this case, feedback control in accordance with the track error signal is not conducted, so that the beam dot does not follow the track correctly. Accordingly, the track crosses the path of the beam dot since the disk is eccentric, which causes the diffraction of light. That is, when a beam dot crosses the adjacent track, a periodic track error signal can be obtained even though it is irregular.

Figure 4:
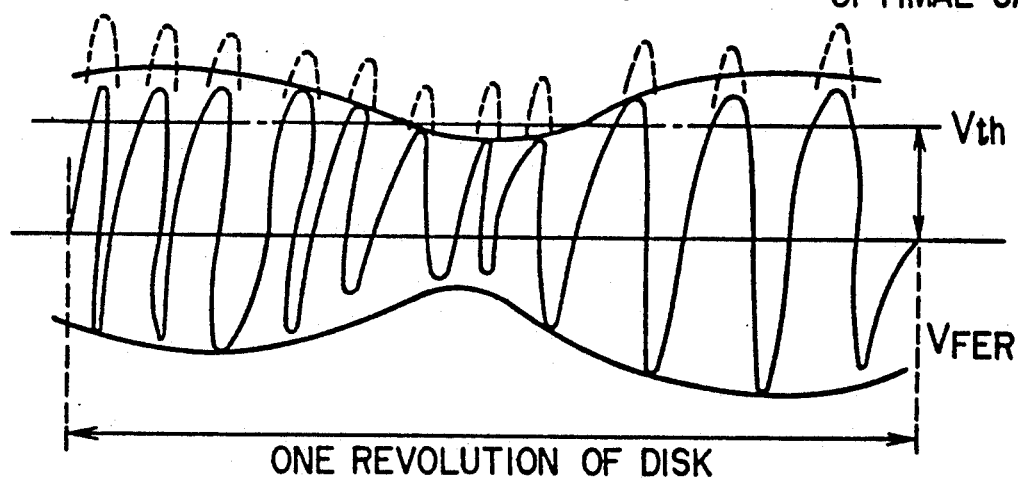
FIG. 4 is a view showing an example of the track error signal caused in the push-pull method when a seeking operation is conducted, wherein the amplitude modulation is conducted.

When a push-pull method is adopted for the track servo system, the track error signal is represented by an S-shaped curve corresponding to the groove and the land. In this case, the aforementioned push-pull method is referred to as the Farfield method by which a beam reflected and diffracted by a guide groove on a disk is received by two light receiving sections divided into two portions and taken out in the form of output difference. The track error signal obtained when the beam dot crosses the adjacent track, is represented by the curve illustrated in FIG. 4 with regard to one revolution of the disk. In this case, when the focus point is shifted with regard to the track moving direction (the seeking direction), the amplitude of the error signal is reduced, or the amplitude is modulated as shown in FIG. 4, so that the level becomes irregular and the obtained curve becomes unstable. Consequently, when the track error signal is utilized for the focus servo operation, a simple detection system such as a system in which the point of the maximum amplitude is determined to be the actual focus point, cannot be adopted.

In order to take countermeasures against this, the apparatus of the present invention is operated as follows: The focus offset voltage is changed for fine adjustment in the area close to the servo-lock point, and the point at which the amplitudes of the track error signal exceed threshold voltage $V_{th}$ most frequently, is regarded as the actual focus point, which is shown by a dotted line in FIG. 4. The focus offset voltage at that time is determined to be the most appropriate value to be adopted when the seeking operation is conducted, and that value is stored in a primary memory provided in a CPU. In an actual seeking operation, the actual focus point is determined in such a manner that this offset voltage is added to the target value (the ground), and focusing control is conducted so that the beam converges upon this point. Due to the foregoing, focusing can be controlled in the seeking operation, and the most appropriate track control signal can be obtained. Tracking servo control can be accurately conducted in accordance with this signal, so that the frequency of misoperation can be reduced, and thus excellent track movement can be conducted. In other words, the beam can be stopped at a target track.

Figure 7:
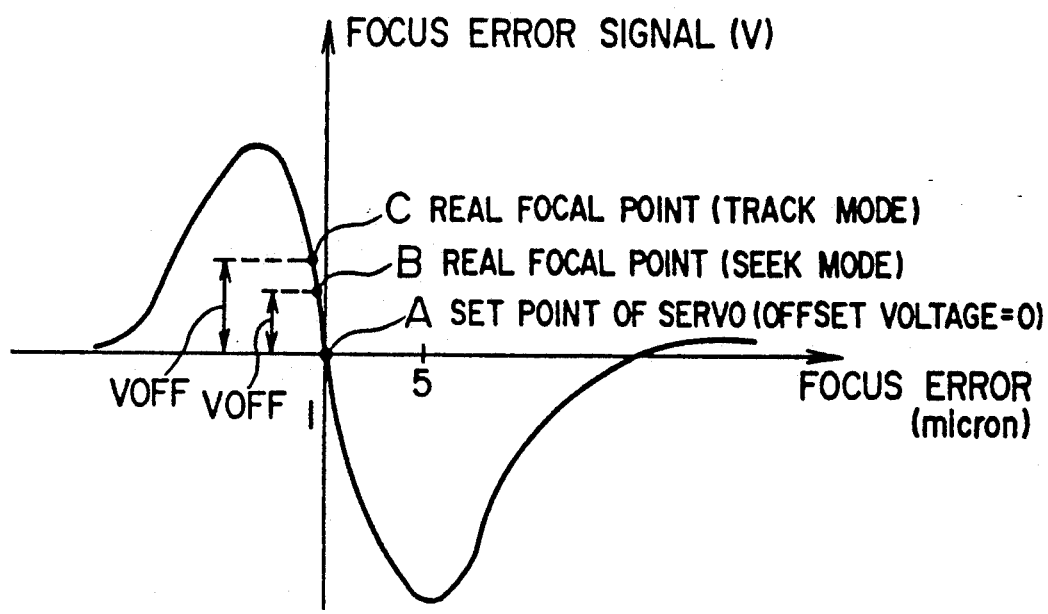
FIG. 7 is a graph in which an S-curve of the focus error in the case of the astigmatic method is illustrated to explain the aspect in which the offset value in the case of track chasing and that in the case of track moving are different to each other.
Figure 8:
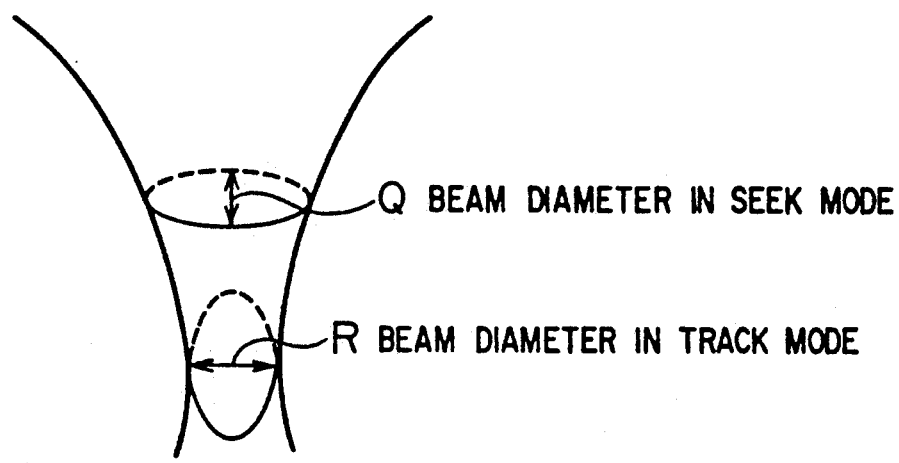
FIG. 8 is a view explaining the reason why the offset values are different in FIG. 7, wherein the reason is the existence of astigmatism in a laser unit.

According to the present invention, the most appropriate focus point in the case of track chasing and that of track moving are different to each other due to the difference of astigmatism peculiar to the laser unit and that of the optical system. Accordingly, the most appropriate offset signals in both states are previously obtained and used properly. That is, astigmatism exists in the laser beam irradiated on a base plate due to the peculiarities of the laser beam and the optical system of the disk, and as shown in FIG. 8, beam diameter Q of the track chasing direction (the circumferential direction) and diameter R of the track moving direction (the radial direction) are different to each other. (In FIG. 8, Q represents the diameter in the case of seeking and R represents the diameter in the case of track chasing.) Consequently, as shown in FIG. 7, actual focus point B in the case of seeking and actual focus point C in the case of track chasing are different, so that different offset values ($V_{off}1$, $V_{off}2$) must be supplied corresponding to actual focus points B and C. Therefore, when offset values ($V_{off}1$, $V_{off}2$) are separately obtained in the process of disk replacement, and used properly, the actual focus condition can be obtained in both cases of playback/writing and seeking. Accordingly, misoperation can be prevented in the cases of playback/writing and track moving, so that the error rate can be reduced. Concerning the optical parts, restriction due to astigmatism can be reduced, so that the degree of freedom can be increased.

Figure 1:
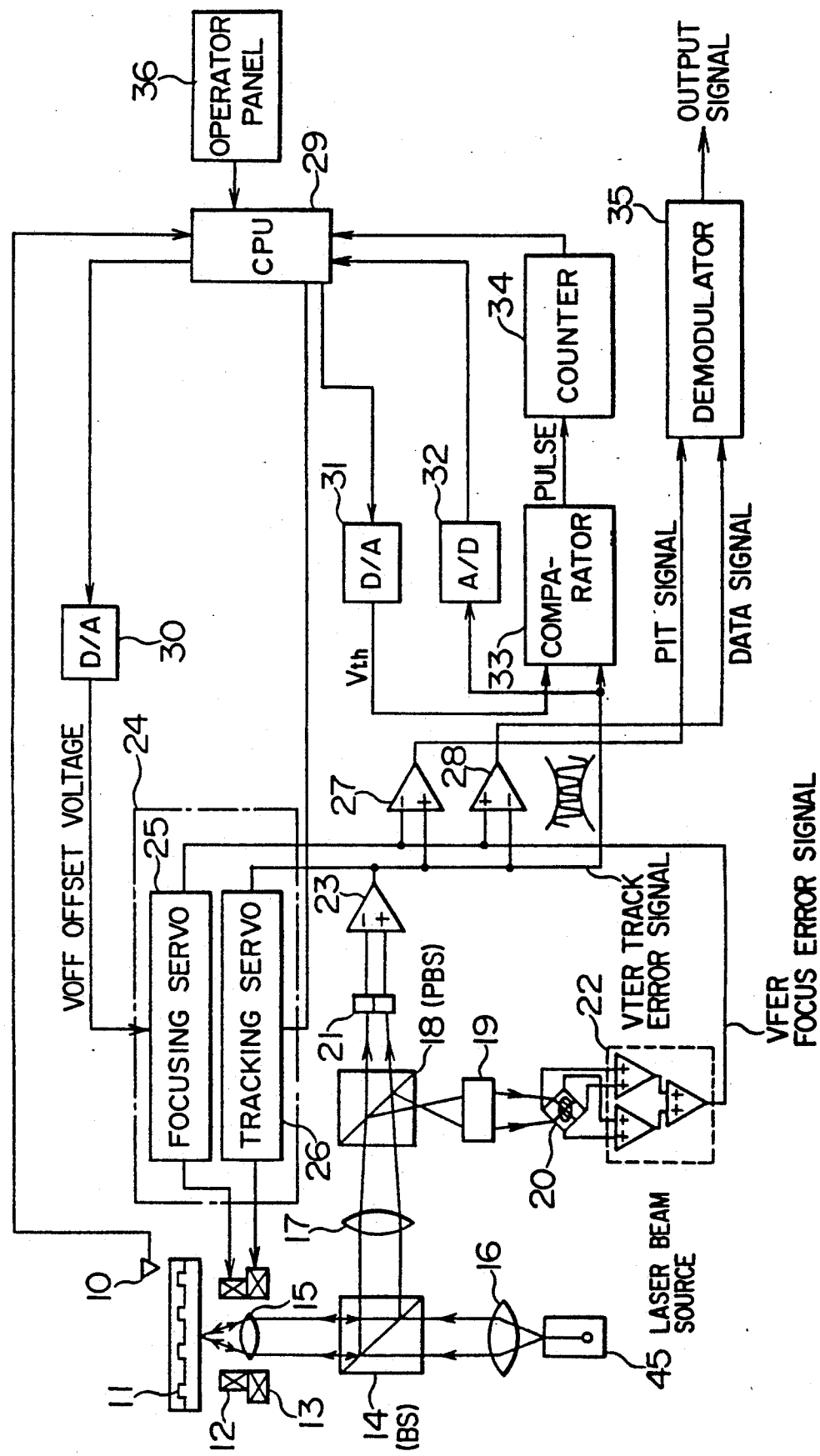
FIG. 1 is a schematic illustration showing the structure of an example of the optical magnetic disk apparatus to which the present invention is applied.

Referring now to the attached drawings, an example in which the focus controlling mechanism of the present invention is applied to an optical magnetic disk apparatus. FIG. 1 is a view showing an example of the structure of an optical magnetic disk apparatus to which the present invention is applied.

In an optical magnetic disk 11, address information is recorded in the form of pit information, and data is recorded in the form of magnetic information. A focus servo circuit 25 and a track servo circuit 26 supply control signals to actuators 12 and 13 so that the longitudinal and lateral movement of an objective lens 15 is controlled. A beam emitted from a laser beam source 45 passes through a collimator lens 16, beam splitter (BS) 14 and objective lens 15, and is guided to the optical magnetic disk 11. The reflected beam is guided to a polarized beam splitter (PBS) 18 through a beam splitter (BS) 14 and a condenser lens 17 so that the beam is divided into two beams having different polarization. One of the divided beams enters into a photodiode 20 and is photoelectrically transferred. Then, addition and subtraction are conducted on the obtained electrical signal by a signal processing circuit 22 to which the astigmatism method is applied, so that focus error signal $V_{FER}$ can be obtained. The differential voltage between the signals of the photo-diode 21 which has been divided into two portions, is outputted from a differential circuit 23 so that track error signal $V_{TER}$ can be obtained. Focus error signal $V_{FER}$ and track error signal $V_{TER}$ are added by an addition circuit 27, and the obtained output is in accordance with the total energy of received light and corresponds to the pit playback signal. The signal of difference between focus error signal $V_{FER}$ and track error signal $V_{TER}$, which has been obtained by a subtraction circuit 28, is utilized as a playback signal of the magnetic recording signal. The playback signal is modulated by a modulator 35 and outputted. The essential structure of the optical magnetic disk apparatus has been explained above.

Next, the mechanism by which the most appropriate focus setting can be automatically set in a seeking operation according to the present invention, will be explained as follows. This mechanism includes: D/A converters 30, 31; an A/D converter 32; a comparator 33 which compares track error signal $V_{TER}$ with threshold voltage $V_{th}$, and generates a pulse when $V_{TER} > V_{th}$; a counter 34 which counts the number of pulses; and a CPU 29 which totally controls the operation of the entire apparatus. Referring now to the flow chart shown in FIG. 2, the most appropriate offset setting operation will be explained below.

First, replacement of the optical magnetic disk 11 is detected by a sensor 10 (step 40). Then, a focus servo operation starts under the condition that the offset is zero (step 41). At this time, a track servo circuit 26 is turned off. Next, CPU 29 rotates the disk 11 while supplying offset data (corresponding to $V_{off}$) to the D/A converter 30, and also supplying threshold voltage data to the A/D converter 32. The comparator 33 compares track error signal $V_{TER}$ with threshold voltage $V_{th}$, and the counter 34 counts the number of the outputted pulses and notifies CPU 29 of the counted value (step 42). CPU 29 repeats the aforementioned operation a predetermined number of times, and the offset data (offset voltage $V_{off}$) at the time when the counted value becomes the maximum, is judged to be the most appropriate focus offset signal in the case of track moving (step 43). The offset data is stored in the primary memory. In this manner, the most appropriate offset voltage in a seeking operation can be automatically determined. The D/A converter 31 which supplies threshold voltage $V_{th}$ can be also used for the purpose of reference voltage to generate a track crossing pulse in the case of a normal operation.

Figure 5:
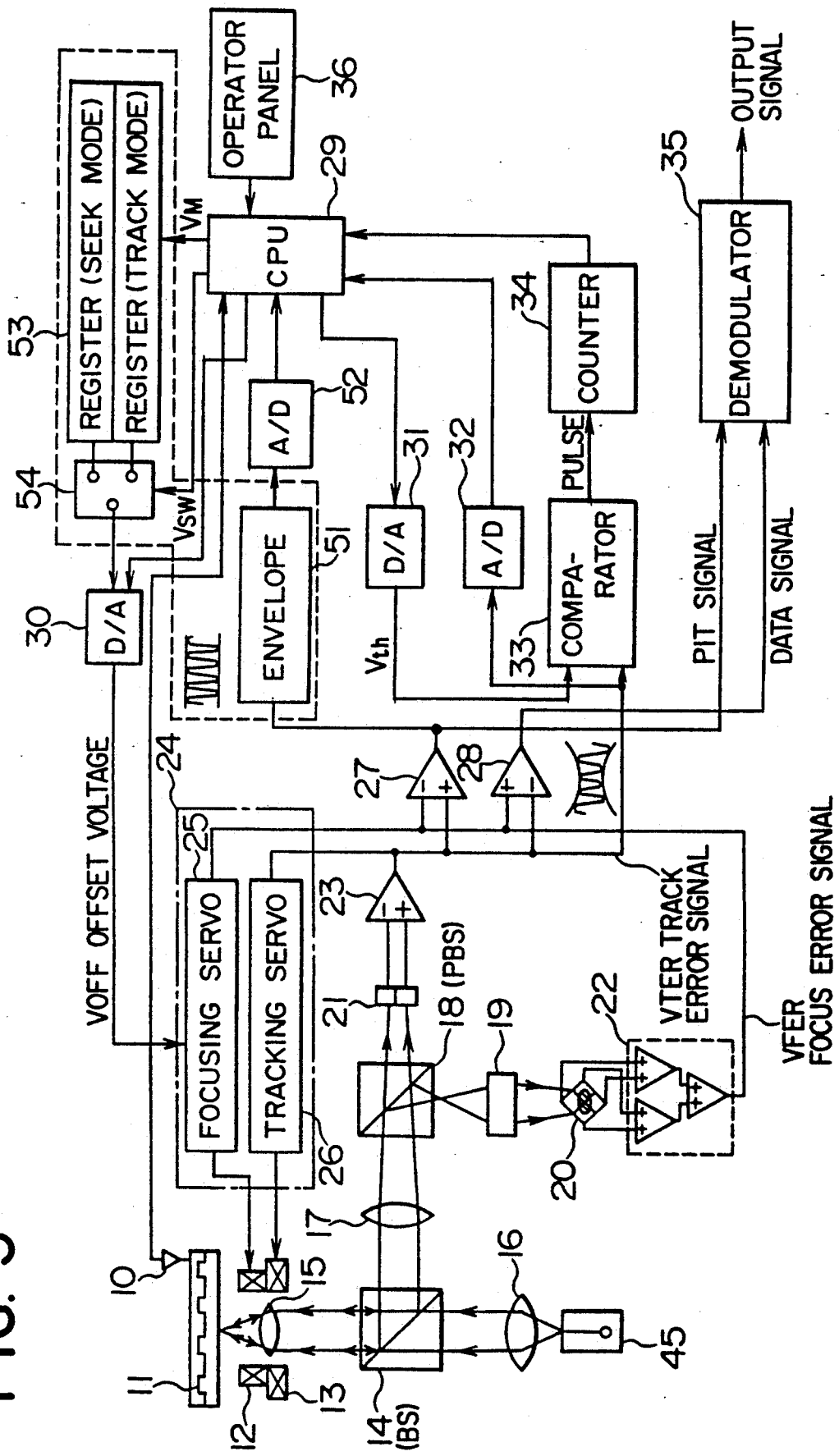
FIG. 5 is a schematic illustration showing the structure of another example of the present invention.

Next, referring to FIG. 5, an example of the present invention will be explained in which the offset voltage is changed over, either for the case of track chasing or that of track moving. This example comprises: the units included in the example shown in FIG. 1; an envelope detection circuit 51; an A/D converter 52; a register 53; and a selector switch 54 (these units are encircled by a dotted line in FIG. 5). Different from an unstable track error signal generated by diffraction of light in the process of seeking, the playback signal obtained in the process of track chasing of playback/writing-in is a signal having a uniform amplitude, so that the most appropriate focus offset value can be determined by detecting the point at which the amplitude becomes maximum.

Figure 2:
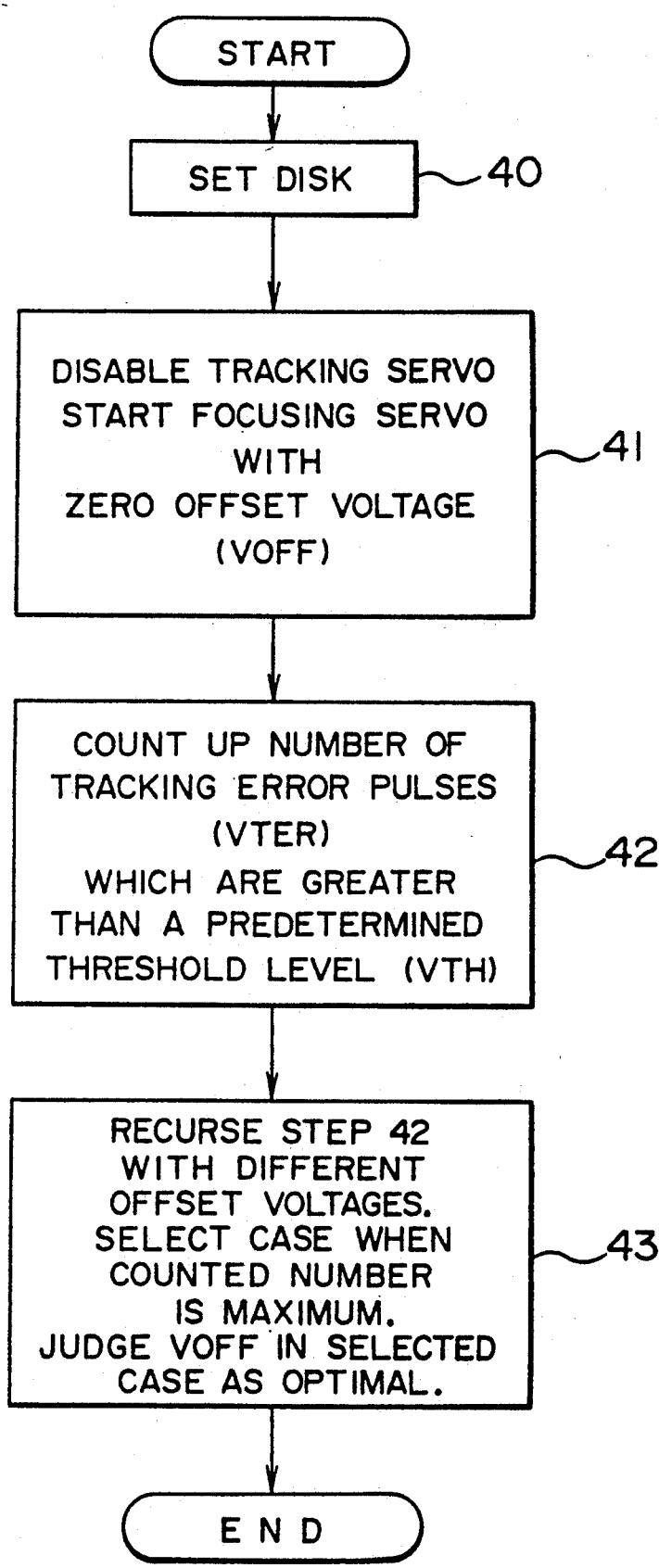
FIG. 2 is a schematic illustration explaining the motion of the essential portion of the apparatus shown in FIG. 1.
Figure 3:
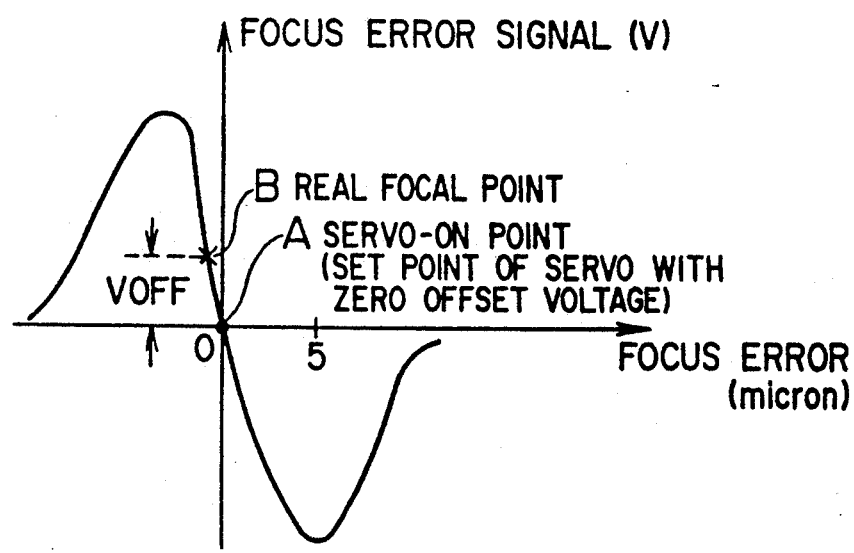
FIG. 3 is a graph in which an S-curve of the focus error in the case of the astigmatic method is illustrated to explain offset $V_{off}$ between designed servo-on point A and actual focus point B.
Figure 6:
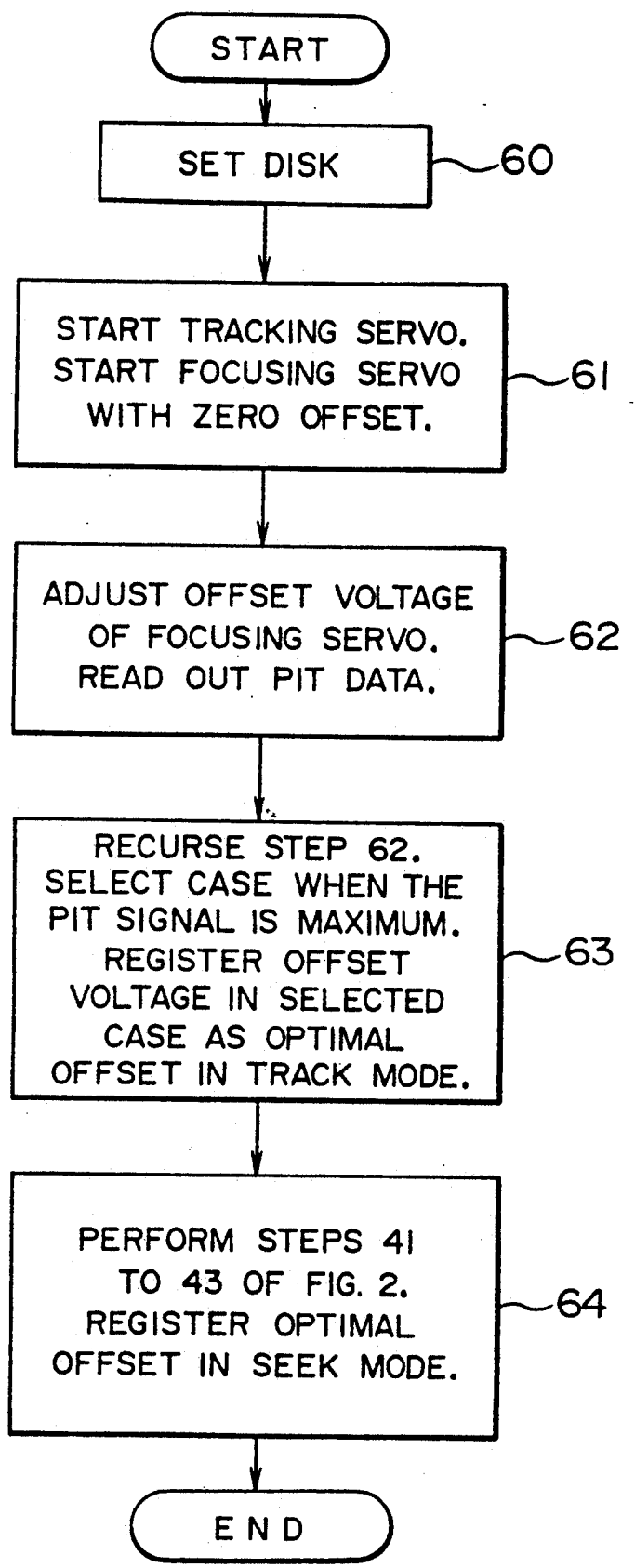
FIG. 6 is a view explaining the motion of each essential portion of the example shown in FIG. 5.

Referring now to the flow chart shown in FIG. 6, the operation of the essential portion of the example shown in FIG. 5 will be explained. When the disk 11 is set (step 60), the focusing servo operation starts under the condition that the offset value is zero (step 61). At this time, the tracking servo operation is also turned on. While supplying the offset voltage data (corresponding to $V_{off}$) to the D/A converter 30, CPU 29 reads out the pit data, which is pit data for control use provided around the inner circumference of the disk (step 62). Next, CPU 29 conducts smoothing with the envelope detection circuit 51, and thus detects the DC component. The detected DC component is digitalized by the A/D converter 52, and its absolute value is used for comparison. The aforementioned operation is repeated while the offset voltage data is finely adjusted, and a point in which the amplitude of playback RF signal becomes maximum, is detected. Offset voltage $V_{off}$ at that time is judged to be the most appropriate focus offset in the case of the track chasing operation, and the value is registered in a register 53 (step 63). Next, steps 41-43 shown in FIG. 2 are carried out, and the value of the obtained most appropriate offset signal in the case of a track moving operation, is registered in the register (step 64). In the aforementioned manner, the value of the most appropriate offset signal can be automatically determined. When a seeking operation or a writing-in/playback operation is directed through the operation of a control panel 36, CPU 29 changes over the switch 54 so that an offset signal corresponding to the operation is selectively outputted, and $V_{off}$ is supplied to the focus servo circuit from the D/A converter 30. This explanation has been made for the case in which the present invention is applied to an optical magnetic disk apparatus. However, it should be appreciated that the present invention is not limited to this specific case. The present invention can be applied to various optical disk apparatus such as CD and CDROM.

As explained above, according to the present invention, the operation is conducted as follows:

The amplitude of the track error signal is increased as a whole. The point at which the track error signal exceeds the threshold voltage $V_{th}$ most frequently is regarded as the actual focus point, and the focus offset voltage at that time is judged to be the most appropriate value, which is stored in the memory. In an actual seeking operation, the point which is determined by adding the aforementioned offset voltage to the target value (the ground) designed in the designing process, is used as the actual focus point, and focus control is conducted so that the beam can converge upon this point.

Due to the foregoing, the following effects can be provided:

The focus error can be prevented in the seeking operation, and the most appropriate track control signal can be obtained. According to the aforementioned obtained signal, accurate tracking servo control can be conducted, so that the rate of errors can be reduced in a moving operation. That is, track moving can be excellently conducted, in other words, the beam can be stopped at a target track.

According to the present invention, different offset values ($V_{off}1$, $V_{off}2$) are obtained corresponding to the track chasing operation and the track moving operation, and the obtained offset values are selectively used. Therefore, an actual focus state can be obtained in both the operation of playback/writing-in and the operation of seeking. Consequently, errors caused in playback/- writing-in and the track moving operation can be prevented, so that the error rate can be reduced. Concerning the optical parts, the restriction imposed by astigmatism is reduced, and the degree of freedom in the usage of parts is increased.

Consequently, according to the present invention, the accuracy of focus servo control can be improved, and a reliable and highly accurate focus control mechanism can be provided.

What is claimed is:

1. An automatic focusing device for use in an optical disk apparatus, comprising:
   means for forming a light beam and focussing said light beam at a focal point;
   a memory for storing a predetermined threshold voltage and a predetermined number of offset voltages;
   focusing means for adjusting the position of said focal point relative to a surface of an optical disk in response to selected ones of said predetermined number of offset voltages;
   tracking error detecting means for generating a tracking error signal when said focal point traverses two neighboring tracks in the optical disk as the optical disk rotates;
   a comparator for comparing said tracking error signal with said predetermined threshold level and generating a comparison pulse when said tracking error signal is higher than said predetermined threshold level;
   a counter for counting the number of said comparison pulses;
   a central processing unit for individually supplying each of said predetermined number of offset voltages to said focusing means, supplying said threshold level to said comparator, receiving said comparison pulses, and determining a first optimal offset voltage, said first optimal offset voltage corresponding to the one of said predetermined number of offset voltages which produces the maximum number of comparison pulses.

2. An automatic focusing device as claimed in claim 1, wherein said focusing means holds said focal point stationary in a radial direction relative to the optical disk and said tracking error detecting means generating said tracking error signal when said focal point crosses over a track in the optical disk due to an eccentricity of the optical disk to the rotation center thereof.

3. An automatic focusing device as claimed in claim 1, further including means for generating a playback signal when the optical disk apparatus is in a seek mode, said central processing unit selecting a second optimal offset voltage corresponding to an offset voltage at which the amplitude of the playback signal is maximized.

4. An automatic focusing device as claimed in claim 1 further including a switch between said central processing unit and said focusing means to direct said first optimal offset voltage to said focusing means when the optical disk apparatus is in a seek mode and to direct said second optimal offset voltage to said focusing means when the optical disk apparatus is in a track mode.

5. An automatic focusing device as claimed in claim 3 further including a switch between said central processing unit and said focusing means to direct said first optimal offset voltage to said focusing means when the optical disk apparatus is in a seek mode and to direct said second optimal offset voltage to said focusing means when the optical disk apparatus is in a track mode.

* * * * *